(12) United States Patent
Matsuda et al.

(10) Patent No.: US 9,657,171 B2
(45) Date of Patent: May 23, 2017

(54) FLAME RETARDANT COMPOSITION

(71) Applicant: CANON KABUSHIKI KAISHA, Tokyo (JP)

(72) Inventors: Katsuhiro Matsuda, Kawasaki (JP); Toshinari Miura, Kawasaki (JP); Takeshi Komuro, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/890,583

(22) PCT Filed: May 13, 2014

(86) PCT No.: PCT/JP2014/002532
§ 371 (c)(1),
(2) Date: Nov. 11, 2015

(87) PCT Pub. No.: WO2014/185066
PCT Pub. Date: Nov. 20, 2014

(65) Prior Publication Data
US 2016/0083579 A1    Mar. 24, 2016

(30) Foreign Application Priority Data

May 17, 2013 (JP) .................................. 2013-105458
Oct. 4, 2013 (JP) .................................. 2013-209628
Apr. 17, 2014 (JP) .................................. 2014-085930

(51) Int. Cl.
*C08L 69/00* (2006.01)
*B29C 47/00* (2006.01)

(52) U.S. Cl.
CPC .......... *C08L 69/00* (2013.01); *B29C 47/0004* (2013.01); *B29K 2995/0016* (2013.01); *C08L 2201/02* (2013.01); *C08L 2203/20* (2013.01); *C08L 2205/035* (2013.01); *C08L 2207/53* (2013.01)

(58) Field of Classification Search
CPC .. C08L 69/00; C08L 2207/53; C08L 2201/02; C08L 2203/20; C08L 2205/035; B29K 2995/0016; B29C 47/0004
See application file for complete search history.

(56) References Cited

U.S. PATENT DOCUMENTS

| | | | | |
|---|---|---|---|---|
| 4,248,976 A * | 2/1981 | Clubley | ................ | C08L 101/02 523/506 |
| 6,528,559 B1 | 3/2003 | Nakacho | | |
| 6,632,891 B1 | 10/2003 | Tada | | |
| 2004/0249070 A1* | 12/2004 | Lim | ...................... | C08F 279/02 525/67 |
| 2012/0052281 A1* | 3/2012 | Ishiguro | ................ | B29C 43/003 428/220 |

FOREIGN PATENT DOCUMENTS

| | | | |
|---|---|---|---|
| CN | 1312815 A | | 9/2001 |
| CN | 101429329 A | | 5/2009 |
| CN | 102361937 A | | 2/2012 |
| EP | 0980896 A1 | | 2/2000 |
| EP | 2058102 A1 | | 5/2009 |
| JP | 10-338802 A | | 12/1998 |
| JP | 11-80381 A | | 3/1999 |
| JP | 11-255876 A | | 9/1999 |
| JP | 2000-169692 A | | 6/2000 |
| JP | 2001-26709 A | | 1/2001 |
| JP | 2002-348575 A | | 12/2002 |
| JP | 2003105670 | * | 4/2003 |
| JP | 2006-077215 A | | 3/2006 |
| JP | 2008-24890 A | | 2/2008 |
| JP | 2009-1747 A | | 1/2009 |
| JP | 2009-132892 A | | 6/2009 |
| JP | 4382617 B2 | | 12/2009 |
| JP | 2013-147651 A | | 8/2013 |
| WO | 00/09518 A1 | | 2/2000 |
| WO | 2011/122464 A1 | | 10/2011 |

OTHER PUBLICATIONS

Zhurnal Obshchei Khimii; "Amino derivatives of aryl phosphates"; vol. 19, p. 126-129.

* cited by examiner

*Primary Examiner* — Robert Jones, Jr.
(74) *Attorney, Agent, or Firm* — Canon U.S.A., Inc. IP Division

(57) ABSTRACT

A flame retardant composition contains the flame retardant described in Claim 1, aromatic polyester, a styrene polymer, rubber having a siloxane bond, and a fluorine compound.

16 Claims, 2 Drawing Sheets

FLAME RETARDANT COMPOSITION

TECHNICAL FIELD

The present invention relates to a flame retardant composition containing aromatic polyester and a styrene polymer.

BACKGROUND ART

Heretofore, resin for use in electrical and electric parts is imparted with flame retardancy by a flame retardant according to the intended use and the portion for which the resin is used. As the flame retardant, bromine flame retardants, phosphorus flame retardants, inorganic flame retardants, silicone flame retardants, and the like are known. For example, the phosphorus flame retardant is kneaded with resin containing aromatic polyester and a styrene polymer (PC+ABS or PC+AS) which has been frequently used for copying machines, and the resin is imparted with the flame retardancy of V-2 to 5VB of the UL94 standard relating to the flame retardancy of resin materials according to the intended use.

On the other hand, a biomass-derived resin containing plants as the raw materials has drawn attention from the viewpoint of a reduction in petroleum resources. For example, polylactic acid containing starch, such as corn, as the raw materials is mentioned. With respect to the biomass-derived resin, the strength and the flame retardancy are improved by an alloy with a petroleum-derived resin and an additive, and then the biomass-derived resin is practically used for cases of copying machines and the like.

However, the flame retardants contain resources of concern for exhaustion, such as petroleum resources and minerals. Thus, the development of a flame retardant utilizing renewable resources, such as plants, has been demanded from the viewpoint of environmental protection.

Among the flame retardants which impart flame retardancy to resin, as substances synthesized using plants as the raw materials, tannin described in PTL 1 (Japanese Patent No. 4382617), potassium hydrogen tartrate described in PTL 2 (Japanese Patent Laid-Open No. 2002-348575), and a phosphorus containing polymer composite salt containing phytic acid described in PTL 3 (Japanese Patent Laid-Open No. 2009-1747) are known.

As the flame retardants obtained from plants, tannin, potassium hydrogen tartrate, and a phosphorus containing polymer composite salt containing phytic acid are known. When these substances were added to aromatic polyester and a styrene polymer (PC+ABS), an impact resistance as high as 5 kJ/m² or more in terms of Charpy impact strength was obtained.

However, the fire retardancy of 5VB of the UL94 standard required when used for cases of copying machines were not developed. This is considered to be because the tannin, the potassium hydrogen tartrate, and the phytic acid are hydrophilic, and therefore they have low compatibility with resin.

CITATION LIST

Patent Literature

PTL 1: Japanese Patent No. 4382617
PTL 2: Japanese Patent Laid-Open No. 2002-348575
PTL 3: Japanese Patent Laid-Open No. 2009-1747

SUMMARY OF INVENTION

The present invention provides a flame retardant composition containing a flame retardant synthesized from plants and having high impact resistance and high fire retardancy.

Accordingly, the present invention is a flame retardant composition containing a flame retardant represented by any one of the following general formulae (1) to (3), aromatic polyester, a styrene polymer, rubber having a siloxane bond, and a fluorine compound, in which the content of the flame retardant is 10 wt % or more and 25 wt % or less when the total weight of the flame retardant composition is 100 wt %, the content of the aromatic polyester is 40 wt % or more and 90 wt % or less when the total weight of the flame retardant composition is 100 wt %, the content of the styrene polymer is 5 wt % or more and 30 wt % or less when the total weight of the flame retardant composition is 100 wt %, the content of the rubber is 1 wt % or more and 15 wt % or less when the total weight of the flame retardant composition is 100 wt %, and the content of the fluorine compound is 0.1 wt % or more and 1.0 wt % or less when the total weight of the flame retardant composition is 100 wt %.

[Chem. 1]

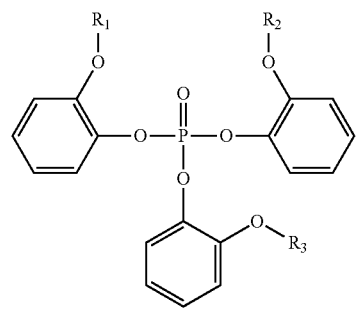

Generation Formula (1)

[Chem. 2]

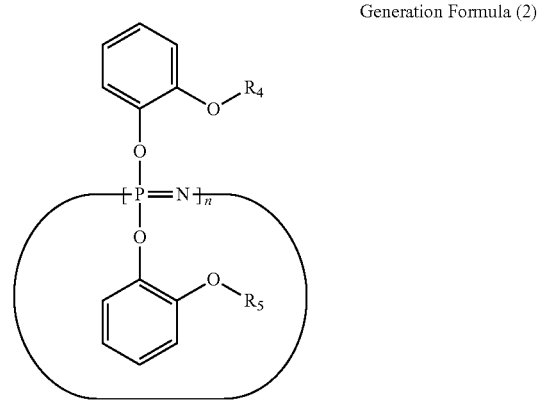

Generation Formula (2)

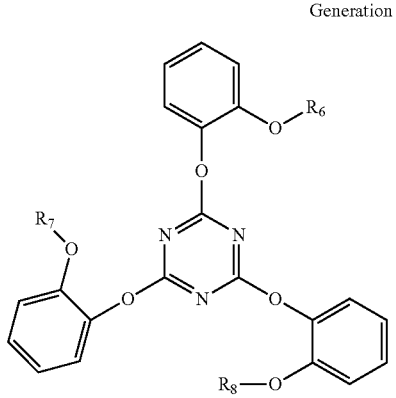

Generation Formula (3)

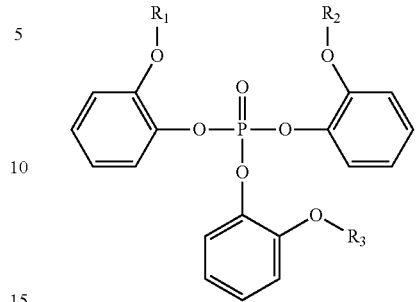

Generation Formula (1)

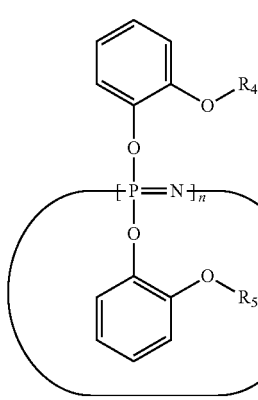

Generation Formula (2)

Generation Formula (3)

In General Formulae (1) to (3), R1 to R8 are alkyl groups. R1 to R8 may be the same or different from each other.

Further features of the present invention will become apparent from the following description of exemplary embodiments.

DESCRIPTION OF EMBODIMENT

Figure 1A:
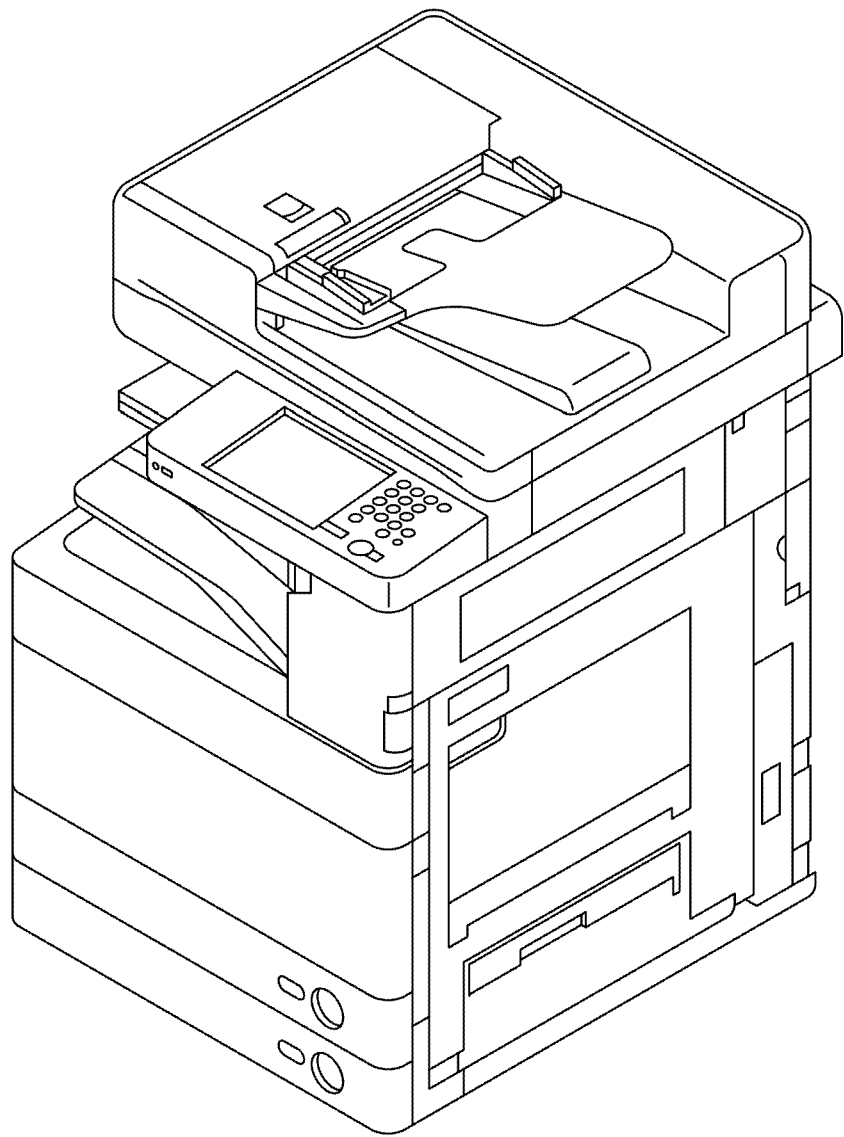
FIG. 1A is an outside view of an example of an image formation apparatus according to this embodiment.

The invention provides a flame retardant composition containing a flame retardant represented by any one of the following general formulae (1) to (3), aromatic polyester, a styrene polymer, rubber having a siloxane bond, and a fluorine compound, in which the content of the flame retardant is 10 wt % or more and 25 wt % or less when the total weight of the flame retardant composition is 100 wt %, the content of the aromatic polyester is 40 wt % or more and 90 wt % or less when the total weight of the flame retardant composition is 100 wt %, the content of the styrene polymer is 5 wt % or more and 30 wt % or less when the total weight of the flame retardant composition is 100 wt %, the content of the rubber is 1 wt % or more and 15 wt % or less when the total weight of the flame retardant composition is 100 wt %, and the content of the fluorine compound is 0.1 wt % or more and 1.0 wt % or less when the total weight of the flame retardant composition is 100 wt %. The addition of the weight (wt %) of each substance above gives 100 wt %.

The flame retardant according to the invention is a frame retardant compound represented by any one of the following general formulae (1) to (3). In this embodiment, the flame retardant shown below is also referred to as a flame retardant compound and is also referred to as an A component as a component of a flame retardant composition.

In General Formulae (1) to (3), R1 to R8 are alkyl groups. R1 to R8 may be the same or different from each other. With respect to the alkyl group, the number of carbon atoms is not particularly limited and the number of carbon atoms is suitably 1 or more and 8 or less, more suitably 1 or more and 4 or less, and particularly suitably 1, i.e., a methyl group.

The flame retardant compound according to the invention has high flame retardancy and does not have a hydroxyl group and has an alkyl group in the structure, and therefore the flame retardant compound according to the invention is lipophilic. Therefore, the flame retardant compound is likely to dissolve in resin containing aromatic polyester and a styrene polymer. Therefore, even when the flame retardant compound is added to the resin, the flame retardant can develop high flame retardancy.

On the other hand, the tannin is hydrophilic because the tannin has a hydroxy group which is hydrophilic in the structure and the potassium hydrogen tartrate and the phosphorus containing polymer composite salt containing phytic acid are hydrophilic because they are salts, and therefore the compatibility thereof with resin is low. As a result, when added to resin, high flame retardancy cannot be demonstrated.

The flame retardant compound according to the invention can demonstrate high flame retardancy even when added to the resin containing aromatic polyester and a styrene polymer.

The flame retardant compound according to the invention can be manufactured by a method described below, for example.

The flame retardant compound according to the invention can be obtained by esterifying guaiacol synthesized from plants and phosphorus oxychloride in the presence of a base or a catalyst as shown in the following reaction formula (1) and known methods can be used.

[Chem. 7]

Reaction Formula (1)

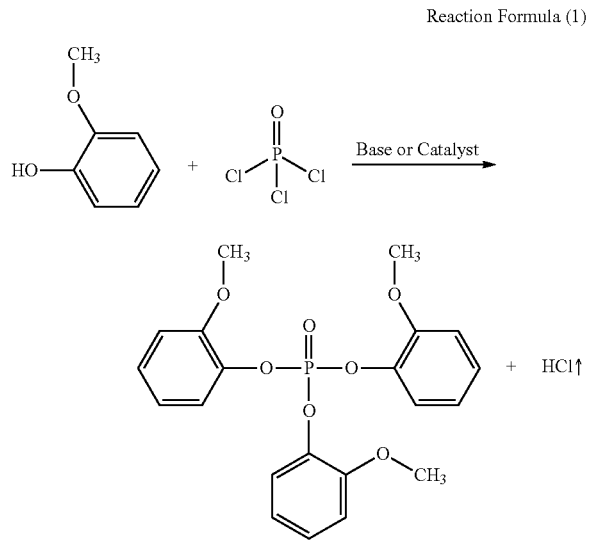

In the description above, a method for manufacturing a compound represented by the following structural formula (1) is described as an example. By selecting a substituent and a start substance as appropriate, the flame retardant according to the invention can be manufactured.

[Chem. 8]

Structural Formula (1)

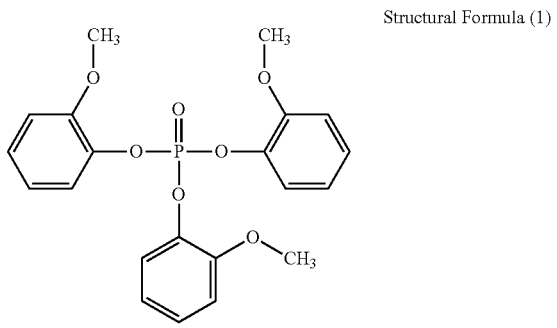

Moreover, in order to advance the etherification in Reaction Formula (1), a base or a catalyst can be made to coexist. The base traps hydrogen chloride to be by-produced to form a hydrochloric acid salt of the base which is made to coexist. Therefore, there is an effect in which the balance of the etherification can be shifted to the reaction product side, so that the reaction speed is increased to improve the yield.

As such a base, tertiary amines, such as triethylamine and pyridine, and alkali metal hydroxides are suitable. When primary amines or secondary amines are used, amide phosphate is generated in addition to phosphate ester, and therefore the yield is low. Moreover, the reaction can also be advanced by making Lewis acid, such as magnesium chloride, coexist, and then heating.

The reaction mixture obtained by the reaction can be purified by a known isolation method. The purification is suitable because the remaining amount of an unreacted substance, a catalyst, and the like becomes small. Specifically, the remaining amount is particularly suitably 1 wt % or less. When the remaining amount of the unreacted substance, the catalyst, and the like is large, the flame retardancy decreases and, when kneading resin, the resin is deteriorated, which may be a cause of reducing the physical properties. The isolation method includes filtration, washing, drying, and the like.

The melting point measured by a differential scanning calorimetry (DSC) of the flame retardant (A component) represented by General Formula (1) of the invention obtained by the method is 99 degree (Celsius) and the 5% weight reduction temperature measured by a thermogravimetry (TGA) is 249 degree (Celsius). These values show that the flame retardant has a heat characteristic which allows the flame retardant to sufficiently stand the kneading with the resin containing aromatic polyester and a styrene polymer and the like.

Guaiacol for use in the flame retardant compound according to the invention is suitably one synthesized from plants from the viewpoint of a reduction in the consumption amount of the petroleum resources. The guaiacol synthesized from plants can be obtained by a known method, such as distilling pyroligneous acid generated when manufacturing charcoal from beech, guaiacum wood, and the like. It is a matter of course that one obtained by chemical synthesis can be used.

In Reaction Formula (1) of this embodiment, a chloride of phosphoric acid is mentioned as an example of the compound to be reacted with guaiacol for etherification. However, the flame retardant compound containing guaiacol can also be obtained by reacting a chloride of a phosphorus-nitrogen compound, such as cyclic phosphonitrile dichloride, a chloride of a nitrogen compound, such as trichloro-1,3,5-triazine, or a chloride of a silicon compound, such as diphenyl dichloro silane, with guaiacol.

Specifically, when the cyclic phosphonitrile dichloride is used, a flame retardant represented by the following general formula (2) can be obtained.

When the trichloro-1,3,5-triazine is used, a flame retardant represented by the following general formula (3) can be obtained.

[Chem.9]

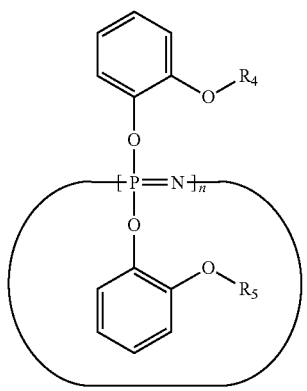

General Formula (2)

[Chem.10]

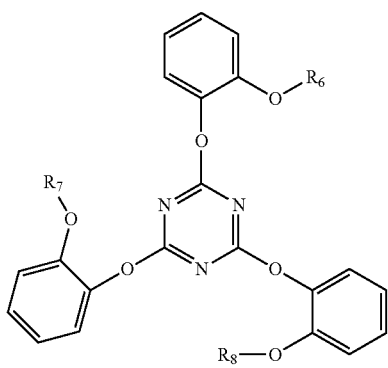

General Formula (3)

In General Formulae (2) and (3), R4 to R8 are alkyls and may be the same or different from each other. With respect to the alkyl group, the number of carbon atoms is suitably 1 or more and 8 or less, more suitably 1 or more and 4 or less, and particularly suitably 1, i.e., a methyl group.

These reactions can be performed in the same manner as the reaction of guaiacol with phosphorous oxychloride which is a chloride of phosphoric acid.

Among the above, the chloride of a phosphorus-nitrogen compound, the chloride of a nitrogen compound, and the chloride of phosphoric acid are suitable, and the chloride of phosphoric acid is particularly suitable.

Hereinafter, the flame retardant resin composition of the invention is described.

The weight of the flame retardant (A ingredient) of the flame retardant composition of the invention is suitably 10 wt % or more and 25 wt % or less when the total weight of the composition concerned is 100 wt %. This is because when the weight is less than 10 wt %, the flame retardant effect becomes low and when the weight exceeds 25 wt %, the strength becomes low.

The aromatic polyester (B component) contained in the composition according to this embodiment is not particularly limited and is suitably aromatic polycarbonate.

The styrene polymer (C component) contained in the flame retardant composition according to this embodiment includes a compound containing styrene as a monomer and a compound containing a styrene derivative as a monomer. These compounds can contain phenylethylene in the structure. Specifically, a copolymer of acrylonitrile, butadiene, and styrene, a copolymer of acrylonitrile and styrene, and the like are mentioned. These copolymers can also be referred to as a compound containing acrylonitrile, butadiene, and styrene and a compound containing acrylonitrile and styrene, respectively.

The B component and the C component are suitably PC+ABS containing polycarbonate and a copolymer of acrylonitrile, butadiene, and styrene and PC+AS containing polycarbonate and a copolymer of acrylonitrile and styrene.

PC+ABS is a mixture of PC (polycarbonate) and ABS (copolymer of acrylonitrile, butadiene, and styrene). The mixing manner thereof is not particularly limited and it is suitable that PC and ABS are mixed to form an alloy resin. The polycarbonate is suitably aromatic polycarbonate.

The weight of the aromatic polyester (B component) contained in the flame retardant composition of the invention is suitably 40 wt % or more and 90 wt % or less when the total weight of the composition is 100 wt %. This is because when the weight is less than 40 wt %, the strength of the resin composition becomes weak and when the weight exceeds 90 wt %, the molding temperature becomes high, which may be a cause of defective coloration of a molded body.

The weight of the styrene polymer (C component) contained in the flame retardant composition of the invention is suitably 5 wt % or more and 30 wt % or less when the total weight of the composition is 100 wt %. When the weight is less than 5 wt %, the molding temperature becomes high, which may be a cause of defective coloration of a molded body. On the other hand, when the weight exceeds 30 wt %, the flame retardancy of the resin composition cannot be achieved. Specifically, in a burning test according to the UL94 standard, the burning time is prolonged and the flame retardancy equal to or higher than V-1 of the UL94 standard cannot be secured.

The rubber having a siloxane bond of the flame retardant composition of the invention includes siliconeacrylic rubber and the like. The form of the siliconeacrylic rubber is not particularly limited and is suitably a core-shell type. In the case of the core-shell type rubber, it is suitable that the silicone and acrylic rubber is a core portion and the acrylic rubber is a shell portion. The siliconeacrylic rubber can also be referred to as siliconeacrylic-based rubber.

A plurality of kinds of siliconeacrylic rubber may be added.

The content of the rubber having a siloxane bond of the flame retardant composition of the invention is suitably 1 wt % or more and 15 wt % or less. When the siliconeacrylic core-shell rubber is less than 1 wt %, there is a possibility that the impact resistance improvement effect is not obtained and when the weight exceeds 15 wt %, there is a possibility that the impact resistance improves but the fire retardancy becomes insufficient.

With respect to the weight (weight %), when a plurality of kinds of siliconeacrylic rubber are contained, the total weight of the plurality of kinds of siliconeacrylic rubber is suitably included in the range above.

The type of the fluorine compound (E component) contained in the flame retardant composition according to this embodiment is not particularly limited and polytetrafluoroethylene (hereinafter referred to as PTFE), PTFE modified with another resin, or a PTFE containing mixture is suitable due to good handling properties and dispersibility. Specifically, Metablen A-3800 (Trade name, manufactured by Mitsubishi Rayon Co. Ltd.) which is an acrylic resin modified PTFE is mentioned. The fluorine compound can be expressed as a fluorine containing compound.

The content of the fluorine compound (E component) contained in the flame retardant resin composition of this embodiment is suitably 0.1 wt % or more and 1.0 wt % or less when the total weight of the composition is 100 wt %. In the case where the weight is less than 0.1 wt %, when a burning test piece is ignited, the resin is likely to melt and drip from the test piece. Therefore, the flame retardancy equal to or higher than V-1 of the UL94 standard is hard to obtain.

When the influence on the environment is taken into consideration, the weight of the PTFE contained in the composition is suitably less than 0.5 wt % when the total weight of the flame retardant composition of this embodiment is 100 wt %.

For example, PTFE is contained in a proportion of 50 wt % based on 100 wt % of the fluoride compound, the addition amount of the fluorine compound is suitably less than 1 wt % when the total weight of the flame retardant composition is 100 wt %.

With respect to the weight ratio of the flame retardant composition according to this embodiment, the charge amount ratio can also be regarded to be the composition ratio of the composition. Moreover, the composition ratio of the composition can also be measured by measuring the NMR.

To the flame retardant composition of this embodiment, a pigment, a heat stabilizer, an antioxidant, an inorganic filler, a plant fiber, a weather resistant agent, a lubricant, a mold release agent, an antistatic agent, and the like can be further added insofar as the properties are not considerably impaired.

A molded body containing the flame retardant resin composition of the invention can be molded into a desired shape. A molding method is not particularly limited and extrusion molding, injection molding, and the like can be used as an example.

The resin contained in the flame retardant composition according to this embodiment may be a collected resin. When using the collected resin, the flame retardant resin can be referred to as a recycled resin. When manufacturing the recycled resin, the flame retardant according to the invention may be added to a prepared resin.

The resin to be collected includes resin used for cases of image formation apparatuses, resin used for camera parts, and resin used for cases and internal parts of personal computers, cases and internal parts of televisions, and water bottles.

The molded body according to this embodiment can be obtained by molding a prepared composition containing the flame retardant compound according to the invention. For the molding, known techniques, such as extrusion molding and injection molding, can be used.

The molded body of this embodiment can be used for internal parts of copying machines, internal parts of laser beam printers, cases and internal parts of ink jet printers, toner cartridge parts of copying machines and laser beam printers, cases and internal parts of facsimiles, camera parts, cases and internal parts of personal computers, cases and internal parts of televisions, and the like.

The molded body according to this embodiment can be used for parts requiring flame retardancy in image formation apparatuses, such as copying machines, laser beam printers, and ink jet printers. Specifically, cases for accommodating photoconductors, member around fixing units, members around power supplies, and the like are mentioned.

Moreover, the molded body according to this embodiment can be used as outer cases insofar as the design is not affected.

Figure 1B:
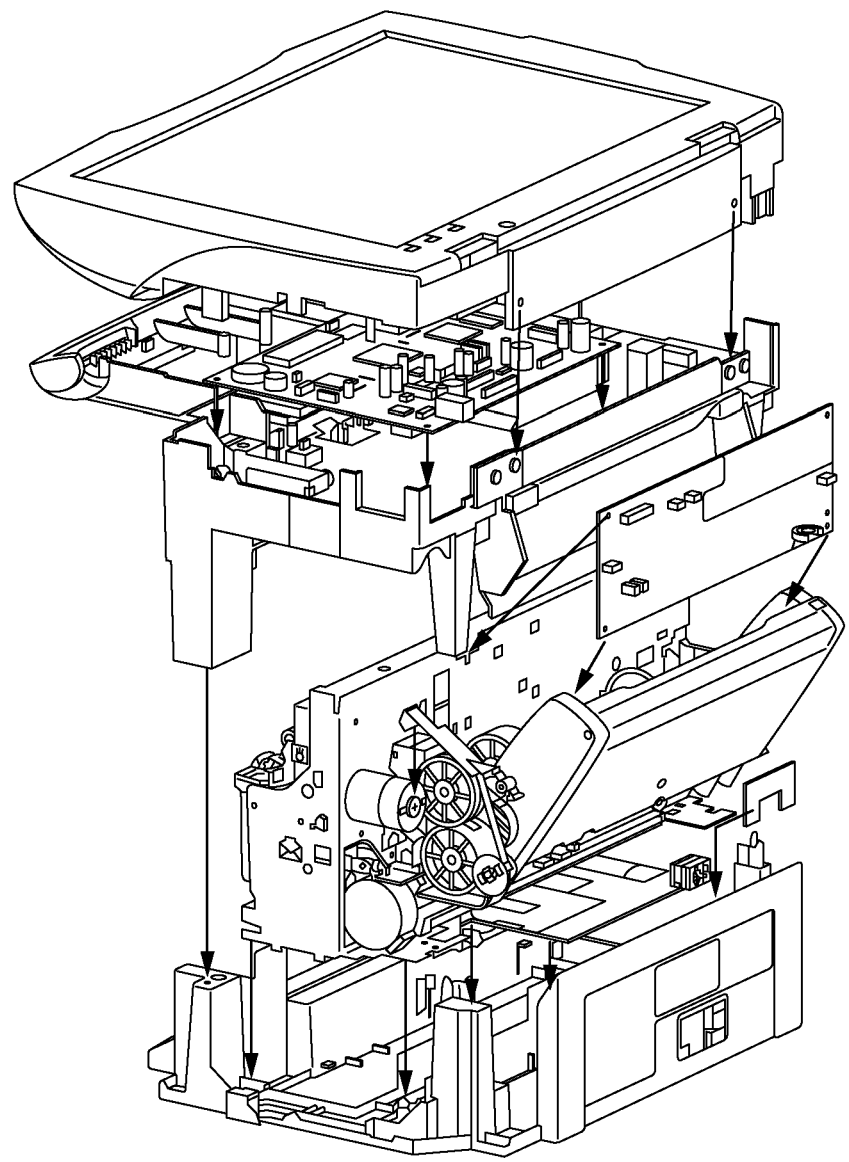
FIG. 1B is a schematic view of an example of the image formation apparatus according to this embodiment.

The image formation apparatus according to this embodiment includes, for example, one illustrated in FIG. 1. FIG. 1A is an outside view of an example of the image formation apparatus. An outer case material is illustrated in FIG. 1A. FIG. 1B is a schematic view illustrating the inside of an example of the image formation apparatus. Internal parts are illustrated in FIG. 1B.

EXAMPLES

Hereinafter, Examples of the invention are described. The technical scope of the invention is not limited thereto. The measurement and the evaluation were performed using the following methods and devices.

<(1) Flame Retardancy>

Test method: V test (20 mm vertical burning test), 5VB test (125 mm vertical burning test), and HB test (Horizontal burning test) according to the UL94 standard The HB test was performed only for those which did not pass the V test.

Sample shape: Test piece for flame retardant test (125 mm×12.5 mm×t2 mm)

<(2) Charpy Impact Value>

Test method: JIS K 7111

Sample shape: Multipurpose test piece (80×10×t4 mm)

Notch processing: Use of Notching tool A-3 (Trade name, manufactured by Toyo Seiki Seisakusho Co., Ltd.), Type A notch.

Measuring device: Digital impact tester DG-UB (Trade name, manufactured by Toyo Seiki Seisakusho Co., Ltd.)

<(3) Melting Point (Tm) Measurement>

Device name: Differential scanning calorimetry manufactured by TA Instruments

Pan: Aluminum pan

Sample weight: 3 mg

Temperature elevation starting temperature: 30 degree (Celsius)

Temperature elevation rate: 10 degree (Celsius)/min

Atmosphere: Nitrogen

<(4) Thermal Decomposition Temperature (Td) Measurement*[1]>

*[1] Temperature at which 5% weight reduction was observed was defined as Td.

Device name: Thermogravimetry manufactured by TA Instruments

Pan: Platinum pan

Sample weight: 3 mg

Temperature elevation starting temperature: 30 degree (Celsius)

Measurement mode: Dynamic rate method*[2]

*[2] Measurement mode in which the heating rate is controlled according to the degree of weight changes, and the resolution improves.

Atmosphere: Nitrogen

Manufacturing Example 1

Synthesis of Flame Retardant (A Component)

Guaiacol (470.8 g, 3.72 mol) dehydrated with $MgSO_4$ and phosphorus oxychloride (190.0 g, 1.23 mol) were weighed out into a 3 L separable flask, and then stirred with a mechanical starter under nitrogen. To the mixture, 1.5 L of THF (Moisture amount of 20 ppm or less) was added. Furthermore, triethylamine (486.6 g, 4.78 mol) was added thereto from a dropping funnel over 1.5 h. The reaction was performed at an internal temperature of 60 degree (Celsius) for 18 h.

The obtained reaction mixture was neutralized in an aqueous NaOH solution, and then the hydrochloride of the triethylamine was removed by filtration to obtain a light yellow filtrate. A reaction mixture obtained by condensing the filtrate by an evaporator was developed in 5 L of water, and then a white crystalline substance was obtained. The white crystalline substance was stirred and washed twice in 5 L of water with a mechanical stirrer over 12 h, filtered, and then vacuum-dried at 70 degree (Celsius) for 48 h, whereby the flame retardant (A component) was obtained with 93% yield.

The melting point (Tm) measured with a differential scanning calorimetry (DSC) of the flame retardant (A component) thus obtained was 99 degree (Celsius) and the 5% weight reduction temperature (Td) measured with a thermogravimetry (TGA) thereof was 249 degree (Celsius). The results clarified that the flame retardant had a heat characteristic which allows the flame retardant to sufficiently stand the kneading with the aromatic polyester and the styrene polymer.

Moreover, the structure was identified by $^1$H-NMR, it was clarified that this product was represented by Structural Formula (1) considering the fact that the peak of the protons of the hydroxy group of the guaiacol disappeared and the integration values (a) of the protons derived from the benzene ring of guaiacol of delta=7.40 ppm, 7.42 ppm, delta=7.11 ppm, 7.13 ppm, and delta=6.87 ppm, 6.87, 6.89, 6.92, 6.94 and the integration values (b) of the protons of a methoxy group of guaiacol of delta=3.76 ppm, 3.79 ppm established (a):(b)=4:3.

Manufacturing Example 2

Synthesis of Phosphorus Containing Polymer Composite Salt

A phosphorus containing polymer composite salt was synthesized as follows based on the description of Example 9 in PLT 3.

400 g (301.2 mmol) of phytic acid (50 wt % aqueous solution, Purity of 50.4%) was weighed out, and then 36.57 g (602.4 mmol) of 28 wt % ammonia water was gradually added thereto with attention to bumping due to heat of neutralization. 140.99 g (602.4 mmol) of 3-(2-aminoethylamino)propyl trimethoxysilane was added to 4.5 L of methanol. An aqueous phytic acid-ammonia water solution was gradually added while stirring the mixed liquid of methanol and aminosilane. Immediately after the addition, a white deposit was generated. The white deposit was stirred for 24 h. After stirring, the deposit was separated by filtration. The deposit was dried at 110 degree (Celsius) for 24 h with a vacuum dryer. After vacuum drying, the deposit was crushed, and put through a 1 mm mesh sieve, and then used for kneading with resin. The yield was 92%.

Examples 1 to 9, Comparative Examples 1 to 14

The PC+ABS used in Examples and Comparative Examples was dried with hot air at 80 degree (Celsius) for 6 hours or more in a pellet state as described in each Example.

The materials shown in Tables 1 to 3 were weighed out in such a manner as to have a mass ratio shown in Tables 1 to 3, and then mixed. Thereafter, the mixture was melt and kneaded with a biaxial extruder (Labopastomill, Trade name, manufactured by Toyo Seiki Seisakusho Co., Ltd.). In Examples 1 to 9 and Comparative Examples 1 to 7, the kneading was performed at a cylinder temperature of 220 degree (Celsius) to 240 degree (Celsius).

In Comparative Example 8 and Comparative Example 9, the PC+ABS (1) and the PC+ABS (2) shown below were dried with hot air at 80 degree (Celsius) for 6 hours without kneading, and then molded into a test piece for flame retardant test (125 mm×12.5 mm×t2 mm) at a cylinder temperature of 235 degree (Celsius) to 250 degree (Celsius) and at a mold temperature of 40 degree (Celsius) using an injection molding machine (SE18DU, Trade name, manufactured by Sumitomo Heavy Industries, Ltd.).

In Comparative Examples 10 to 14, kneading was performed at a cylinder temperature of 200 to 220 degree (Celsius) in such a manner that the heat deterioration degree of the flame retardant was low. Then, the resin discharged from the extruder top end was cut into a pellet shape to obtain pellets of the resin.

The obtained pellets were dried with hot air at 80 degree (Celsius) for 6 hours, and then molded into a test piece for flame retardant test (125 mm×12.5 mm×t2 mm) at a cylinder temperature of 200 degree (Celsius) to 220 degree (Celsius) and at a mold temperature of 40 degree (Celsius) using an injection molding machine (SE18DU, Trade name, manufactured by Sumitomo Heavy Industries, Ltd.). However, in Comparative Example 10 and Comparative Example 12, since the fluidity was low, the cylinder temperature of the injection molding machine was set to 220 degree (Celsius) to 235 degree (Celsius), and then test pieces for flame retardant test were molded.

As each material shown in Table 1 to Table 3, the following materials were used.

PC+ABS(1) "Cycoloy C1110" Trade name, manufactured by SABIC, Weight ratio of PC and ABS of 7:3

PC+ABS(2) "Cycoloy C1200HF" Trade name, manufactured by SABIC, Weight ratio of PC and ABS of 8:2

Flame retardant (A component): One described in Manufacturing Example 1

Tannic acid: manufactured by Kishida Chemical Co., Ltd.

Sodium laurate: manufactured by Kishida Chemical Co., Ltd.

Sucrose: manufactured by Kishida Chemical Co., Ltd.

Potassium hydrogen tartrate: manufactured by Kishida Chemical Co., Ltd.

Phytin: "Phytin (extract)" manufactured by Tsuno rice fine chemicals Co., Ltd.

Phosphorus containing polymer composite salt: One described in Manufacturing Example 2

Siliconeacrylic-based core-shell rubber: Metablen SX005 (Trade name, manufactured by Mitsubishi Rayon Co., Ltd.) and Metablen S-2006 (Trade name, manufactured by Mitsubishi Rayon Co., Ltd.)

Fluorine compound: "Metablen A-3800" Trade name, manufactured by Mitsubishi Rayon Co., Ltd.

Processing stabilizer: "IRGANOX B220" Trade name, manufactured by BASF

Butadiene rubber: "Metablen C223A" Trade name, manufactured by Mitsubishi Rayon Co., Ltd.

The compounding ratios and the measurement results of the flame retardancy (V test and 5VB test) and the Charpy impart strength of Examples 1 to 9 were shown in Table 1. The compounding ratios and the measurement results of the flame retardancy (V test and 5VB test) and the Charpy impart strength of Comparative Examples 1 to 7 were shown in Table 2. The compounding ratios and the measurement results of the flame retardancy (V test and 5VB test) and the Charpy impart strength of Comparative Examples 8 to 14 were shown in Table 3. The judging criteria of the V test (20 mm vertical burning test) of the UL94 standard were shown in Table 4. The judging criteria of the 5VB test (125 mm vertical burning test) of the UL94 standard were shown in Table 5.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Resin (wt %) | PC + ABS (1) | — | — | — | — | — | — | — | — | — |
|  | PC + ABS (2) | 83.8 | 80.8 | 77.8 | 79.8 | 78.8 | 77.8 | 77.8 | 80.8 | 77.8 |
| Flame retardant (wt %) | Flame retardant (A) | 12 | 15 | 18 | 15 | 15 | 15 | 15 | 15 | 15 |
| Fluorine compound (wt %) | A-3800 | 1 | 1 | 1 | 1 | 1 | 1 | 1 | 1 | 1 |
| Antioxidant (wt %) | IRGANOX B220 | 0.2 | 0.2 | 0.2 | 0.2 | 0.2 | 0.2 | 0.2 | 0.2 | 0.2 |
| Siliconeacrylic-based core-shell rubber | Metablen SX005 | 3.0 | 3.0 | 3.0 | 3.0 | 3.0 | 3.0 | 6.0 | — | — |
| Siliconeacrylic-based core-shell rubber | Metablen S-2006 | — | — | — | 1.0 | 2.0 | 3.0 | — | 3.0 | 6.0 |
| Experiment results | V test (2.0 mm thick) | V-1 | V-1 | V-1 | V-1 | V-1 | V-1 | V-1 | V-1 | V-1 |
|  | 5VB test (2.0 mm thick) | 5VB | 5VB | 5VB | 5VB | 5VB | 5VB | 5VB | 5VB | 5VB |
|  | Charpy impact strength (kJ/m$^2$) | 14.7 | 7.9 | 6.1 | 13.2 | 13.9 | 24.7 | 8.9 | 8.6 | 20.3 |

TABLE 2

|  |  | Comp. Ex. 1 | Comp. Ex.2 | Comp. Ex.3 | Comp. Ex. 4 | Comp. Ex. 5 | Comp. Ex. 6 | Comp. Ex. 7 |
|---|---|---|---|---|---|---|---|---|
| Resin (wt %) | PC + ABS (1) | 76.8 | — | — | — | — | — | — |
|  | PC + ABS (2) | — | 83.8 | 80.8 | 76.8 | 80.8 | 86.8 | 89.8 |
| Flame retardant (wt %) | Flame retardant (A) | 22 | 15 | 18 | 22 | 15 | 12 | 9 |
| Fluorine compound (wt %) | A-3800 | 1 | 1 | 1 | 1 | 1 | 1 | 1 |
| Antioxidant (wt %) | IRGANOX B220 | 0.2 | 0.2 | 0.2 | 0.2 | 0.2 | 0.2 | 0.2 |
| Butadiene rubber | Metablen C223A | — | — | — | — | 3 | — | — |
| Experiment results | V test (2.0 mm thick) | V-1 | V-0 | V-0 | V-0 | V-0 | V-0 | V-0 |
|  | 5VB test (2.0 mm thick) | Not-pass | Not-pass | Not-pass | Not-pass | Not-pass | Not-pass | Not-pass |
|  | Charpy impact strength (kJ/m$^2$) | 1.8 | 5.8 | 3.0 | 1.4 | 3.6 | 13.2 | 18.7 |

TABLE 3

|  |  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Resin (wt %) | PC + ABS (1) | 100 | — | 98.3 | 88.8 | 78.8 | 78.8 | — |
|  | PC + ABS (2) | — | 100 | — | — | — | — | 78.8 |

TABLE 3-continued

| | | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Flame retardant (wt %) | Tannin | — | — | 0.14 | — | — | — | — |
| | Sodium laurate | — | — | 0.07 | — | — | — | — |
| | Sucrose | — | — | 0.29 | — | — | — | — |
| | Potassium tartrate | — | — | — | 10 | — | — | — |
| | Phytin | — | — | — | — | 20 | — | — |
| | Phosphorus containing polymer composite salt | — | — | — | — | — | 20 | 20 |
| Fluorine compound (wt %) | A-3800 | — | — | 1 | 1 | 1 | 1 | 1 |
| Antioxidant (wt %) | IRGANOX B220 | — | — | 0.2 | 0.2 | 0.2 | 0.2 | 0.2 |
| Experiment results | V test (2.0 mm thick) | Not-pass | Not-pass | Not-pass | Not-pass | Not-pass | Not-pass | Not-pass |
| | HB test (2.0 mm thick) Burning rate mm/min | 38.1 | 38.1 | 39.1 | 64.5 | 33.6 | 0 | 0 |
| | Charpy impact strength (kJ/m$^2$) | 60 | 40 | 56 | 15.2 | 4.1 | 5.1 | 5.0 |

TABLE 4

| | V-0 | V-1 | V-2 |
|---|---|---|---|
| Burning time after first or second flame movement of each sample | 10 seconds or less | 30 seconds or less | 30 seconds or less |
| Total burning time after ten times of flame movement | 50 seconds or less | 250 seconds or less | 250 seconds or less |
| Total of burning time after second flame movement and flashpoint time | 30 seconds or less | 60 seconds or less | 60 seconds or less |
| Ignition of absorbent cotton due to falling body | Not-occurred | Not-occurred | Occurred |

TABLE 5

| Judgment Criteria | 5VB |
|---|---|
| Total of burning time after fifth flame contact and flashpLoint time of each sample | ≤60 seconds |
| Ignition of absorbeLnt cotton due to burning fragments and falling burning body from a bar sample | Not-occurred |

As shown in Table 1, the flame retardant resin composition of the invention can obtain the fire retardancy equivalent to 5VB of the UL94 standard and a high impact strength of 5 kJ/m$^2$ or more in terms of the Charpy impact strength and can be used for a portion requiring flame retardancy, such as cases of copying machines.

On the other hand, the system to which the siliconeacrylic-based core-shell rubber was not added obtained V-1 or more in the V test but did not pass the 5VB test as shown in Table 2.

As shown in Table 3, Comparative Examples 10 to 14 had high impact resistance but did not pass the V test. It was found that when the combination of tannin, sodium laurate, and sucrose was kneaded with PC+ABS, the burning rate in the horizontal burning test was higher than that of the PC+ABS simple substance, and the flame retardancy was lower than that of the PC+ABS simple substance.

Moreover, it was found that when hydrogen sodium tartrate was also kneaded with PC+ABS, the burning rate increased than the PC+ABS simple substance, and the flame retardancy decreased. The phytin and the phosphorus containing polymer composite salt lowered the burning rate in the horizontal burning test than the PC+ABS simple substance but did not pass the V test.

The invention can provide a flame retardant composition containing a flame retardant synthesized from plants and has high impact resistance and high fire retardancy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-105458, filed May 17, 2013, 2013-209628, filed Oct. 4, 2013, and 2014-085930, filed Apr. 17, 2014, which are hereby incorporated by reference herein in their entirety.

The invention claimed is:

1. A flame retardant composition, comprising:
   a flame retardant represented by any one of the following general formulae (1) to (3);

an aromatic polyester;
a styrene polymer;
rubber having a siloxane bond; and
a fluorine compound, wherein
  a content of the flame retardant is 10 wt % or more and 25 wt % or less when a total weight of the flame retardant composition is 100 wt %,
  a content of the aromatic polyester is 40 wt % or more and 90 wt % or less when the total weight of the flame retardant composition is 100 wt %,
  a content of the styrene polymer is 5 wt % or more and 30 wt % or less when the total weight of the flame retardant composition is 100 wt %,
  a content of the rubber is 1 wt % or more and 15 wt % or less when the total weight of the flame retardant composition is 100 wt %, and
  a content of the fluorine compound is 0.1 wt % or more and 1.0 wt % or less when the total weight of the flame retardant composition is 100 wt %, General Formula (1)

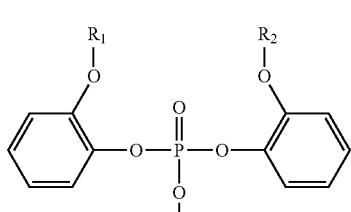

General Formula (2)

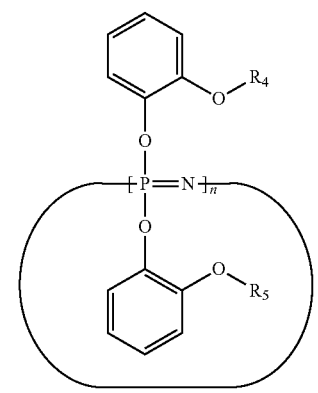

General Formula (3)

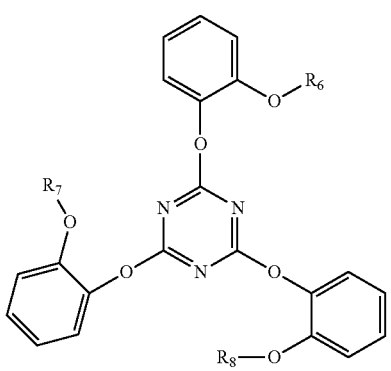

wherein, in General Formulae (1) to (3), $R_1$ to $R_8$ are alkyl groups and $R_1$ to $R_8$ may be the same or different from each other, and wherein, in General Formula (2), n represents a number of phosphazene units.

2. The flame retardant composition according to claim 1, wherein the aromatic polyester is aromatic polycarbonate.

3. The flame retardant composition according to claim 2, wherein the styrene polymer is a copolymer of acrylonitrile, butadiene, and styrene or a copolymer of acrylonitrile and styrene.

4. The flame retardant composition according to claim 3, wherein the aromatic polycarbonate and the copolymer of acrylonitrile, butadiene, and styrene or the copolymer of acrylonitrile and styrene form an alloy.

5. The flame retardant composition according to claim 1, wherein the rubber is silicone acrylic rubber.

6. The flame retardant composition according to claim 1, wherein the rubber is core-shell type rubber.

7. The flame retardant composition according to claim 6, wherein, in the core-shell type rubber, a core portion of the rubber of the core-shell type rubber is silicone and acrylic rubber.

8. The flame retardant composition according to claim 1, wherein the fluorine compound is a compound containing polytetrafluoroethylene.

9. A molded body comprising the flame retardant composition according claim 1.

10. The molded body according to claim 9, wherein the aromatic polyester and the styrene polymer are obtained from collected resin.

11. The molded body according to claim 10, wherein the collected resin is resin whose flame retardancy and impact resistance decrease.

12. The molded body according to claim 9, wherein flame retardancy is 5VB in a V test of UL94 standard.

13. An image formation apparatus, comprising:
  a photoconductor; and
  a case for accommodating the photoconductor, wherein the case is the molded body according to claim 9.

14. A method for manufacturing a flame retardant composition containing a flame retardant represented by any one of the following general formulae (1) to (3);
  an aromatic polyester;
  a styrene polymer;
  a rubber having a siloxane bond; and
  a fluorine compound, the method comprising:
    preparing the aromatic polyester and the styrene polymer, wherein
    the aromatic polyester is prepared in such a manner as to have a content of 40 wt % or more and 90 wt % or less when a total weight of the flame retardant composition is 100 wt %, and the styrene polymer is prepared in such a manner as to have a content of 5 wt % or more and 30 wt % or less when the total weight of the flame retardant composition is 100 wt %,
    mixing the aromatic polyester and the styrene polymer,
    adding the flame retardant to have a content of 10 wt % or more and 25 wt % or less when the total weight of the flame retardant composition is 100 wt %,
    adding the rubber to have a content of 1 wt % or more and 15 wt % or less when the total weight of the flame retardant composition is 100 wt %, and
    adding the fluorine compound to have a content of 0.1 wt % or more and 1.0 wt % or less when the total weight of the flame retardant composition is 100 wt %, General Formula (1)

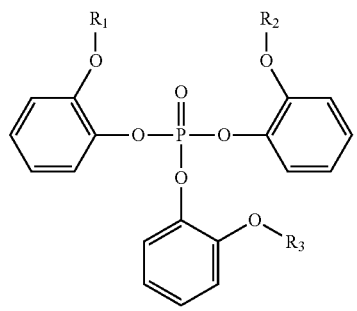

General Formula (2)

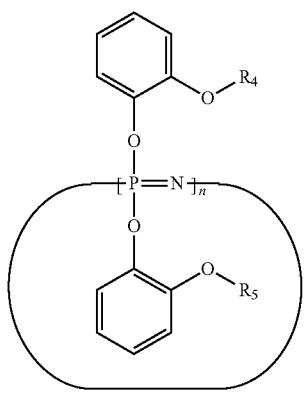

General Formula (3)

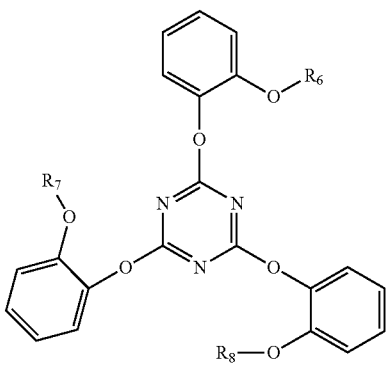

wherein, in General Formulae (1) to (3), R1 to R8 are alkyl groups and R1 to R8 may be the same or different from each other, and wherein, in General Formula (2), n represents a number of phosphazene units.

15. A method for manufacturing a molded body, comprising:
preparing a flame retardant composition; and then
molding the flame retardant composition, wherein
the flame retardant composition is a flame retardant composition obtained by the method for manufacturing a flame retardant composition according to claim 14.

16. The method for manufacturing a molded body according to claim 15, wherein the molding of the frame retardant composition is extrusion molding or injection molding.

* * * * *